April 3, 1962  W. O. GALONSKA  3,027,618
ZIPPER

Filed Sept. 22, 1959  7 Sheets-Sheet 1

INVENTOR.
WALTER O. GALONSKA
BY
ATTORNEY

April 3, 1962 W. O. GALONSKA 3,027,618
ZIPPER

Filed Sept. 22, 1959 7 Sheets-Sheet 2

INVENTOR.
WALTER O. GALONSKA
BY
ATTORNEY

April 3, 1962 W. O. GALONSKA 3,027,618
ZIPPER
Filed Sept. 22, 1959 7 Sheets-Sheet 3

INVENTOR.
WALTER O. GALONSKA
BY
ATTORNEY

April 3, 1962  W. O. GALONSKA  3,027,618
ZIPPER
Filed Sept. 22, 1959  7 Sheets-Sheet 4
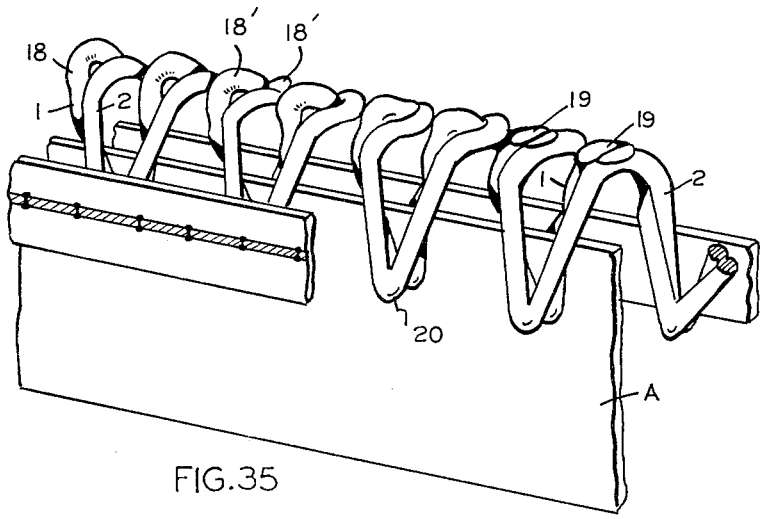
FIG.35
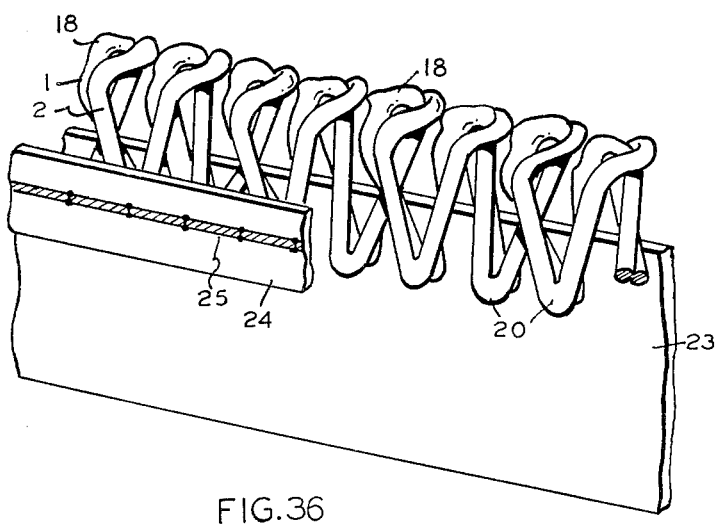
FIG.36
INVENTOR.
WALTER O. GALONSKA
BY
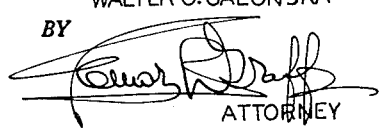
ATTORNEY April 3, 1962 W. O. GALONSKA 3,027,618
ZIPPER
Filed Sept. 22, 1959 7 Sheets-Sheet 5
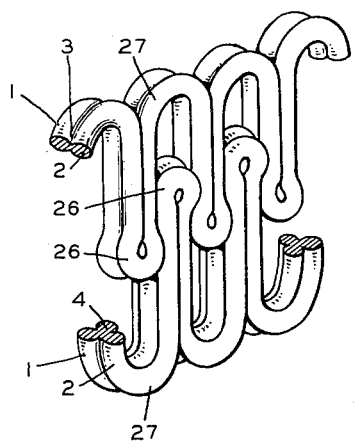
FIG. 37.
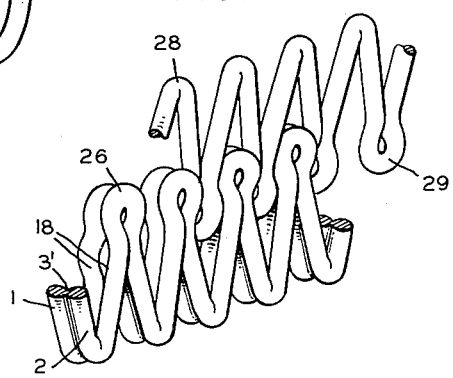
FIG. 38.
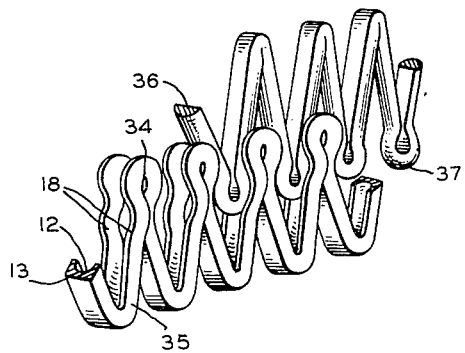
FIG. 45.
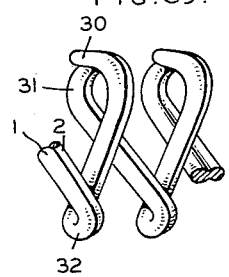
FIG. 39.
INVENTOR.
WALTER O. GALONSKA
BY
ATTORNEY April 3, 1962 W. O. GALONSKA 3,027,618
ZIPPER
Filed Sept. 22, 1959 7 Sheets-Sheet 6
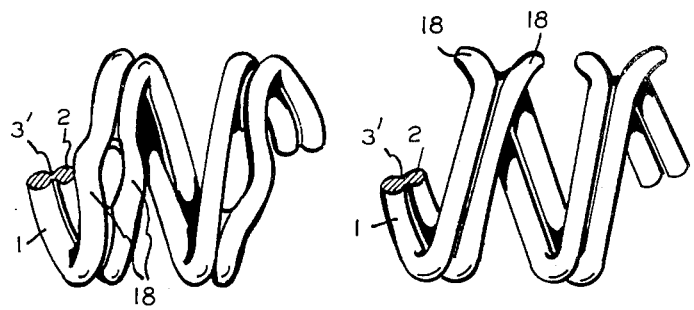
FIG.40   FIG.41
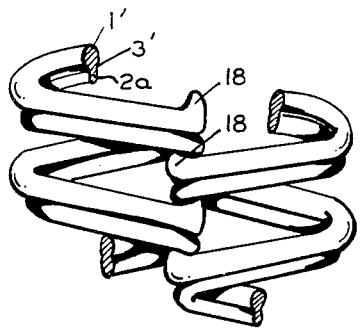
FIG.42
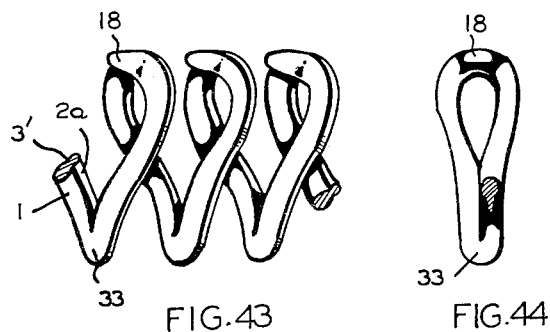
FIG.43   FIG.44
INVENTOR.
WALTER O. GALONSKA
BY
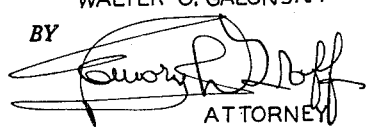
ATTORNEY April 3, 1962 W. O. GALONSKA 3,027,618
ZIPPER Filed Sept. 22, 1959 7 Sheets-Sheet 7

INVENTOR.
WALTER O. GALONSKA
BY
ATTORNEY

# United States Patent Office 3,027,618
Patented Apr. 3, 1962

3,027,618
ZIPPER
Walter O. Galonska, Savignystrasse 73, Frankfurt am Main, Germany
Filed Sept. 22, 1959, Ser. No. 841,600
Claims priority, application Germany Sept. 25, 1958
5 Claims. (Cl. 24—205.13)

This invention relates to zippers.

More particularly the improvements are directed to a zipper whose link rows are made from a continuous wire length which is bent either along a spiral, meander, or sinuous shape, the sinuous strip being, in the latter case, bent in U-form about the longitudinal center axis. To obtain a firm grip of the two interengaging link rows, it is known how to form locking noses or the like at the points serving for interengagement, or to provide cross-section changes, in that each link row is made from two or more intertwisted wire lengths.

It has further been proposed to make each spiral from two adjacent wire lengths of different thickness and spiral diameter. However, in this case a firm contiguous position of the two wires is not insured. Another proposal is to make at least one of the two spirals from two spirals screwed together, or, respectively, to telescope two spirals in axis-parallel position, although the two spirals do not present convolutions of uniform pitch.

The present invention relates especially to a new design of a zipper whose link rows are made from a wire spiral, or a wire meander, and are provided at the anchoring points with locking noses. That is to say, each link row is made from a smooth wire length, provided in the bending plane, with a constriction and bulged out or displaced at the anchoring points to one or both sides. The bulging can be effected by division at the constriction, or by flattening. In both cases there result anchor noses of considerable size toward both sides in the bending plane, which noses lead to a good grip of the links even in extremely small zippers. The wire length may be designed symmetrical or asymmetrical in cross-section in relation to the constriction, and the cross-section may present, moreover, any other possible form. Further, the constriction may be so designed that there result three symmetrical partial cross-sections connected together by webs.

An important point is that when being shaped into the spiral or meander, the wire length is not twisted in itself. The new design is explained below with reference to the new figures, in which.

FIGURES 23 through 26 schematically show four models of wire lengths prepared for shaping into the spiral or sinuous shape.

Figure 27:
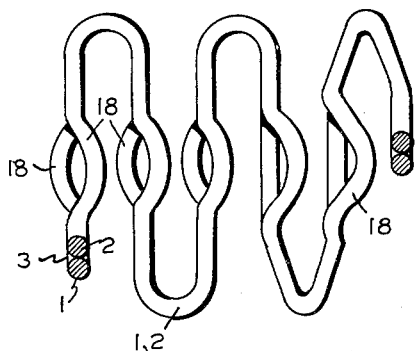

FIGURE 27 is a detail elevation showing a wire length bent into a sinuous form.

Figure 28:
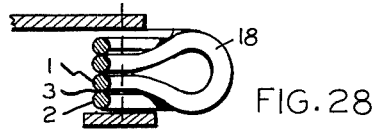
Figure 29:
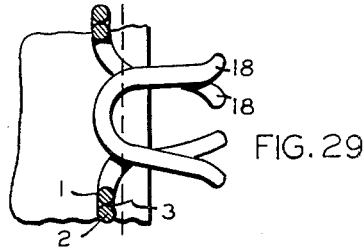

FIGURES 28 and 29 illustrate in front and side views the sinuous strip bent into U-form.

Figure 30:
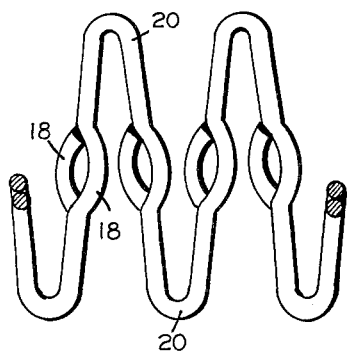

FIGURE 30 is a second form of sinuous strip.

Figure 31:
Figure 32:
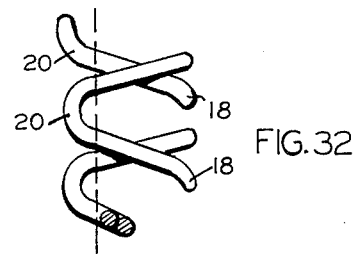

FIGURES 31 and 32 are respectively the front and side views of the finished U-shape.

Figure 33:
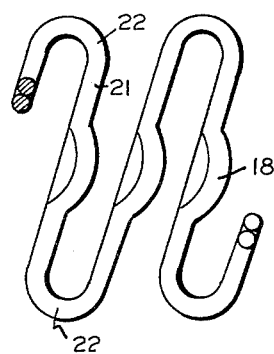
Figure 34:
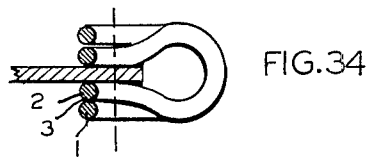

FIGURES 33 and 34 are details of a third model of the sinuous strip.

FIGURES 35 and 36 are perspective views showing two different sinuous strips bent in U-form.

FIGURES 37 through 39 are also perspective views showing three additional models.

FIGURES 40 through 42 show three detail diagrammatic examples of link rows bent along a spiral.

FIGURES 43 and 44 are detail diagrammatic views illustrating a crossed spiral.

Figure 20:

FIGURE 45 is a detail perspective view of a closure from a wire profiled according to FIGURE 20 and a wire of half-round cross-section.

Figure 46:
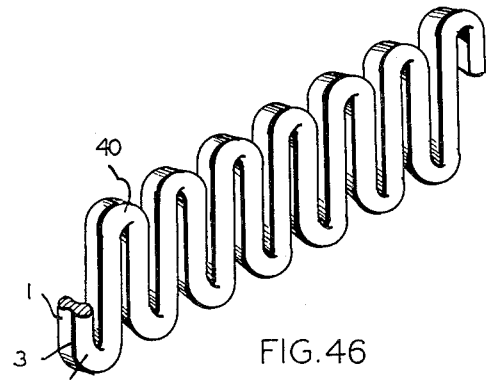

FIGURE 46 is a perspective view of a length of wire, having a groove along its center, and bent into a sinuous strip.

Figure 47:
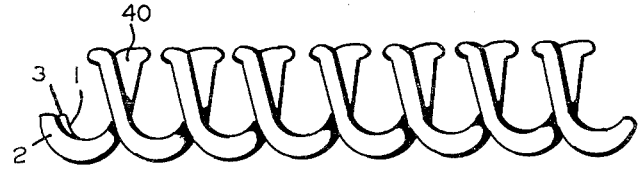

FIGURE 47 is a side view of the sinuous strip after the bending over of one side to the opposite side at 90°.

Figure 48:
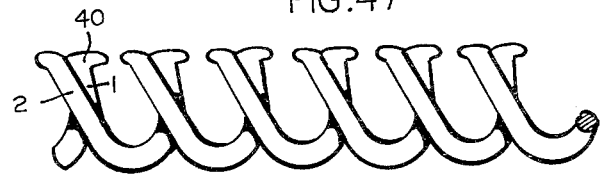

FIGURE 48 is a side view of an articulated link row according to FIGURE 47.

Figure 49:
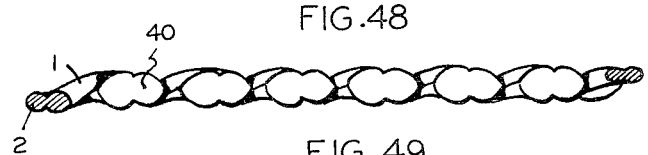

FIGURE 49 is a top plan view of the articulated link row shown in FIGURE 47.

Figure 50:
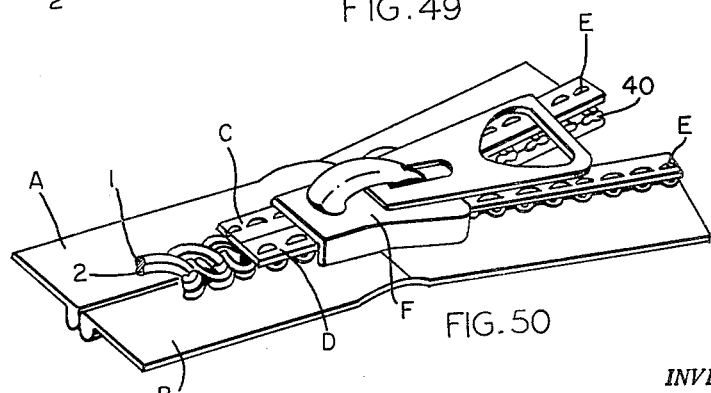

FIGURE 50 shows the arrangement of two articulated link rows on a strip of cloth.

Similar reference characters designate corresponding parts throughout the several figures of the drawing.

Figure 1:
FIGURES 1 through 8 are diagrammatic elevational views, partly in section, of different models of the wire length with varying cross-sections.
Figure 9:
FIGURES 9 through 22 are cross sectional views of different forms of wire.

According to FIGURES 1 and 9, one starts with a wire length of oval cross-section provided in the longitudinal median plane on both sides with a constriction or groove 3, so that the result is two connected partial circular sections 1, 2.

Figure 2:
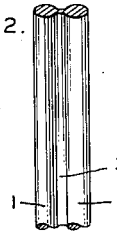
Figure 10:

In the modification shown in FIGURES 2 and 10, the two partial circular sections 1 and 2 are connected together by a center web 3' forming the constriction or groove.

Figure 3:
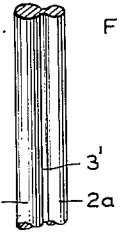
Figure 4:
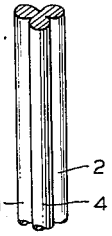
Figure 11:

In the embodiment according to FIGURES 3 and 11, the two partial sections 1, 2a connected by a web 3' have different marginal cross-sections. FIGURE 4 shows a wire length whose cross-section consists of three closely connected circular sections 1, 2, and 4.

Figure 5:

FIGURE 5 shows a wire length consisting of two connected semi-circular cross-sections 1', 2'.

Figure 8:
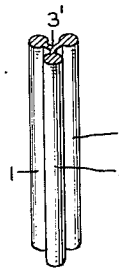
Figure 12:
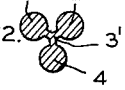
Figure 13:
Figure 15:
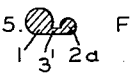
Figure 16:
Figure 17:
Figure 14:
Figure 19:

According to FIGURES 8 and 12, the three circular cross-sections 1, 2 and 4 are connected together by short webs 3'. According to FIGURE 16, the circular cross-sections are replaced by semi-circular cross-sections 1b, 1c, 1d. According to FIGURE 13, the constriction or groove 8 is made only on one side, and according to FIGURE 14, the connecting web 3' is located on one side of the two partially flattened partial cross-sections 1e, 2e. A corresponding variant of FIGURE 11 is shown in FIGURE 15. According to FIGURE 17, one cross-sectional portion 9 is formed as a half-round area. FIGURE 19 shows two partial cross-sections in the form of equilateral or isosceles triangles 1f, 2f, which are connected at their apices or summits.

Figures 6, 7:
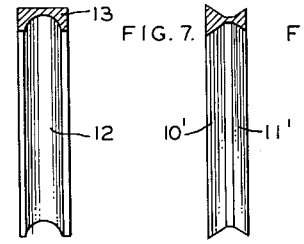
Figure 18:
Figure 21:
Figure 22:

According to FIGURES 7 and 18, the triangular cross-sections 1f, 2g are differently proportioned. FIGURES 6 and 20 show a rectangular cross-section 13 unilaterally provided with a constriction by an arc 12. FIGURES 21 and 22 show a semi-circular cross-section 14 with a constriction 15, 15' starting from the apex of the arch or from the center of the base line, respectively.

Figures 23, 24, 25, 26:
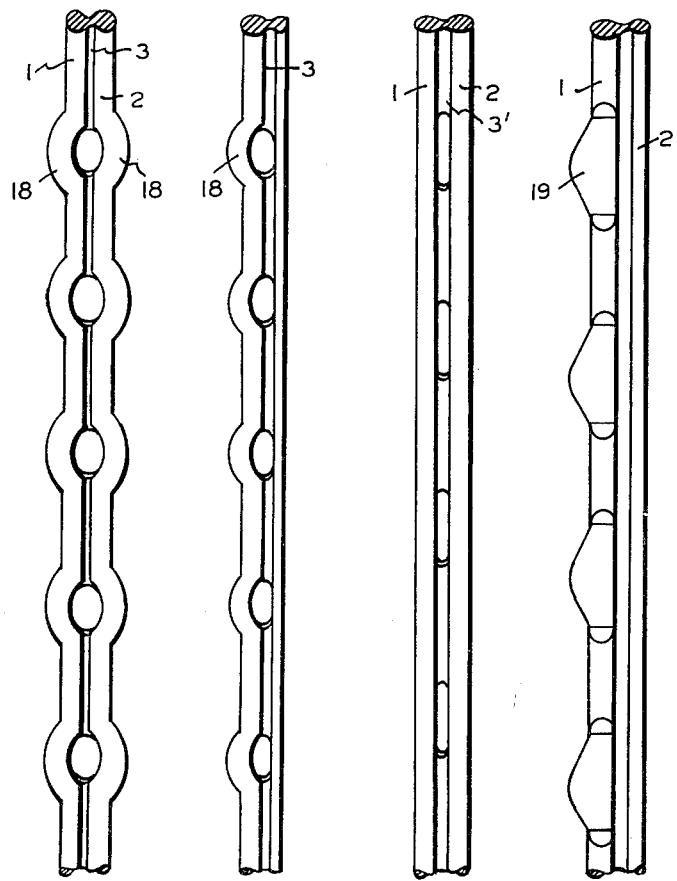

For the formation of the anchor noses 18, following the making of the wire lengths, the groove or constriction 3, or the center web 3' (FIGURE 25) is divided at equal intervals, it being advantageous simultaneously to bulge out the partial cross-sections to one or both sides to form anchor noses 18 in the plane of the wire length by introducing a conical tool (FIGURES 23, 24) between parts 1 and 2. Instead of bending by separation through the use of said tool, the anchor noses 18 may be produced by the flattening 19 of one or both wire cross-sections 1, 2 in certain intervals (FIGURE 26).

The wire lengths thus prepared are bent according to FIGURE 27 along a sinuous path, in such a way that the bulges 18 face each other. FIGURE 27 shows in the left portion a design with bulges or anchor noses 18 on both sides, while in the right portion anchor noses 18 are curved out only to one side. This sinuous form is then bent in known manner about the longitudinal center axis into a U-form (FIGURES 28, 29).

According to FIGURES 30–32, the points of deflection 20 of the sinuous form are made relatively small and the webs 18 extend outward from the respective point of deflection. When bending to U-form, the points of deflection 20 are then pressed or bent until they are disposed in one plane. FIGURES 33 and 34 show a sinuous form with webs 21 extending parallel to each other but obliquely to the longitudinal center axis. The points of deflection 22 are then opposite one another.

FIGURE 35 shows in perspective the sinuous strip according to FIGURE 30 bent to U-form, but with the points of deflection not bent into the same plane to be applied on the two sides of the sewing band A. The illustration includes unilateral anchor noses 18, bilateral anchor noses 18′, as well as flattened portions 19 leading to anchor noses.

FIGURE 36 again shows the U-shaped sinuous strip as per FIGURE 30, but with the points of deflection 20 in a common plane. This link row is placed on a cloth strip 23 on one side and covered at the points of deflection by a strip 24, the parts being held together by a seam 25.

According to FIGURE 37, one link row is formed by a wire length 1, 2, 4 according to FIGURE 4. This wire length is bent in a sinuous whose bridge-pieces are contiguous, the reversals 26 being designed as small eyes, while the reversals 27 describe a relatively large arc, so that there remains between two adjacent eyes 26 a free space corresponding to the thickness of two partial cross-sections of the other link row. The bending of this link row occurs in the center plane through two partial cross-sections, so that the third partial cross-section 4 lies on the outside in the reversal points 26 and on the inside in the reversal points 27.

The other link row is formed by a wire length according to FIGURE 1, both of whose partial cross-sections 1, 2 have circular form and are connected across a constriction 3. The deflection occurs in the same manner as for the other link row, namely, in the plane of the groove or constriction 3.

The eyes 26 of both link rows interlock upon closure and form the desired releasable connection between the parts to be connected.

FIGURE 38 shows a zipper whose one link row is made of a wire length according to FIGURE 2 with two partial cross-sections 1, 2 and a center web 3′. This wire length is bent in the plane of the said web 3′ along a sinuous path, the bulges 18 always being close to a reversal point 26 and this reversal point 26 being designed as an eye. The other link row consists of a simple round wire length 28 which is bent along a sinuous path and which is shaped at one reversal point 29 again to form eyes. Upon closure of the two link rows the eyes 29 of link row 28 engage behind the eyes 26 of the other link row, placing themselves between the bulges 18.

According to FIGURE 39, a wire length of the cross-section as per FIGURE 9 and with unilaterally deflected anchor noses 30 is wound along a figure-eight spiral, the connecting rib lying in the winding plane. The one arc 31 of the figure-eight spiral is made relatively large, while the counter-arc 32 is designed as an eye. The eyes 32 and the anchor noses 30 lie in one plane.

FIGURE 40 shows a spiral bent from a wire length 1, 2, 3′ according to FIGURE 2 having unilaterally or bilaterally bulged anchor noses 18, there being one anchor nose to each turn, and the anchor noses all lying on the same surface line, so that these results, in side view, the form shown in FIGURE 41. The locking of two link rows according to FIGURE 40 and FIGURE 41 is shown in FIGURE 42. Here the starting material is a wire length according to FIGURE 3, bulges 18 being provided only in the partial form 1′ of large cross-section.

FIGURES 43 and 44 show a wire spiral made from a wire length according to FIGURE 3, whose turns are bent together in an acute angle on the opposite sides lying in the plane of the bulges 18. These tips 33 then form the attaching or sewing points for the respective link row.

In the embodiment according to FIGURE 45, a wire length 13 of the cross-section according to FIGURES 6 and 20 is bent in a sinuous path along the axis of the concavity 12, the reversal points of the one side being designed as eyes 34 and the web lengths 35 below the eyes 34 being separated from each other by bulges 18. The counter link row is formed by a half-round wire 26 which is bent in zigzag form and in which the reversal points of the concave side intended for engagement with the other wire length are designed as eyes 37 which, when the two link rows are interlocked, place themselves into the bulges 18 of the other link row.

The length of wire is bent according to FIGURE 46 into the shape of a sinuous path in the plane lying perpendicular to the groove 3, so that both of the partial cross sections 1, 2 are lying next to one another. From the intermediary form (as in FIGURE 46) the back portions 40 are twisted at 90° to one side of the plane of curvature so that an articulated link arises whose side view appears like that of FIGURE 47 or FIGURE 48.

When the link row such as shown in FIGURE 48 is viewed from the top it would appear as in FIGURE 49. FIGURE 50 illustrates a completed zipper assembly embodying the subject invention. A pair of link rows each comprising sections 1 and 2 are placed along the mating edges of two binding strips A and B. The link rows which are according to the form shown in FIGURES 47–49 may be secured to the strips A and B by means of small strips C and D which are placed over the link rows and held thereto by means of stitches E passing through both of the strips and the link rows. The slide F used is of the type well known in the art.

By means of the twisting there results, since the total height of the meander curvature remains the same, a flattening at the reverse-twisted position which forms a projection formation 19 on both partial cross sections. These projections 19 are oppositely directed facing one another in each case and narrow the distance of the sinuous steps from one another. Thus, there results articulated link rows which are flat on the outside and which in themselves provide the necessary latching projections for the closing together of the two articulated link rows.

I claim:

1. A link row member used in pairs forming a zipper, each row comprising, a sinuous formed wire length whose cross sectional profile comprises a plurality of substantially circular sections contiguous to one another, the transverse axes of said sections along one side of said row disposed at a 90° twist from the transverse axes of said sections along the opposite side of said row whereby said first mentioned axes lie in a single plane parallel to the longitudinal axis of said row, axially aligned anchor noses projecting from at least one of said sections along one side of said row and disposed within the plane of said first mentioned axes, the end of each of said anchor noses on each of said rows projecting towards the proximate section of an adjacent side of said wire length to define a restricted gap for receiving in locking engagement corresponding anchor noses of the other of said rows.

2. A link row member as described in claim 1 wherein the substantially circular sections are integrally connected by a web.

3. A link row member according to claim 1 wherein the substantially circular sections are integrally connected by a web providing an intermediate portion having flat outer faces.

4. A link row member according to claim 1 wherein the substantially circular sections are spaced apart laterally by a connecting web.

5. A link row member according to claim 1 wherein each of the substantially circular sections has a different cross-sectional area.

References Cited in the file of this patent

UNITED STATES PATENTS

| | | |
|---|---|---|
| 2,296,880 | Smith | Sept. 29, 1942 |
| 2,300,443 | Wahl | Nov. 3, 1942 |
| 2,919,482 | Casson | Jan. 5, 1960 |

FOREIGN PATENTS

| | | |
|---|---|---|
| 199,145 | Austria | Aug. 11, 1958 |